United States Patent [19]

Evans et al.

[11] Patent Number: 5,375,978
[45] Date of Patent: Dec. 27, 1994

[54] FOREIGN OBJECT DAMAGE RESISTANT COMPOSITE BLADE AND MANUFACTURE

[75] Inventors: Charles R. Evans; Barrett J. Fuhrman, both of Cincinnati; Jackie D. Jones, Fairfield; Richard A. Ridilla, Harrison, all of Ohio

[73] Assignee: General Electric Company, Cincinnati, Ohio

[21] Appl. No.: 131,106

[22] Filed: Oct. 4, 1993

Related U.S. Application Data

[63] Continuation of Ser. No. 877,504, May 1, 1992, abandoned.

[51] Int. Cl.$^5$ ............................................. F01D 5/14
[52] U.S. Cl. .................................. 416/230; 416/224; 416/241 A; 416/229 A
[58] Field of Search .................. 416/224, 229 A, 230, 416/241 R, 241 A, 248

[56] References Cited

U.S. PATENT DOCUMENTS

| | | |
|---|---|---|
| 3,600,103 | 8/1971 | Gray . |
| 3,664,764 | 5/1972 | Davies et al. .................. 416/230 |
| 3,679,324 | 7/1972 | Stargardter . |
| 3,731,360 | 5/1973 | Stone, Jr. ...................... 416/229 A |
| 3,752,600 | 8/1973 | Walsh et al. ................... 416/230 |
| 3,892,612 | 7/1975 | Carlson et al. . |
| 3,942,231 | 3/1976 | Whitaker . |
| 3,989,876 | 11/1976 | Moji et al. . |
| 4,006,999 | 2/1977 | Brantley . |
| 4,010,530 | 3/1977 | Delgrosso . |
| 4,022,547 | 5/1977 | Stanley . |
| 4,029,838 | 6/1977 | Chamis et al. . |
| 4,043,703 | 8/1977 | Carlson . |
| 4,051,289 | 9/1977 | Adamson . |
| 4,071,184 | 1/1978 | Carlson et al. . |
| 4,111,606 | 9/1978 | Prewo . |
| 4,472,866 | 9/1984 | Moracz et al. ................. 416/229 A |
| 4,473,446 | 9/1984 | Locke et al. . |
| 4,594,761 | 6/1986 | Murphy . |
| 4,810,167 | 3/1989 | Spoltman . |

FOREIGN PATENT DOCUMENTS

| | | | |
|---|---|---|---|
| 896416 | 2/1945 | France ......................... 416/230 |
| 5101 | 1/1988 | Japan ........................... 416/230 |
| 209901 | 7/1992 | Japan . |
| 2147055 | 5/1985 | United Kingdom ......... 416/230 |

OTHER PUBLICATIONS

"Wide Chord Fan Club"—Flight International, May 23-29, 1990 pp. 36-38.

*Primary Examiner*—Edward K. Look
*Assistant Examiner*—James A. Larson
*Attorney, Agent, or Firm*—Jerome C. Squillaro; David L. Narciso

[57] ABSTRACT

The present invention provides a composite airfoil particularly useful as a fan blade, having a high degree of twist, in a large high bypass ratio turbofan engine. The composite airfoil of the present invention has a progression of filament reinforced airfoil laminations of varying span, arranged in order by span, and interrupted by at least one filament reinforced airfoil lamination having a span out of height order to form what is called a confused or broken shear plane where radially outer tips of the laminations end.

14 Claims, 6 Drawing Sheets

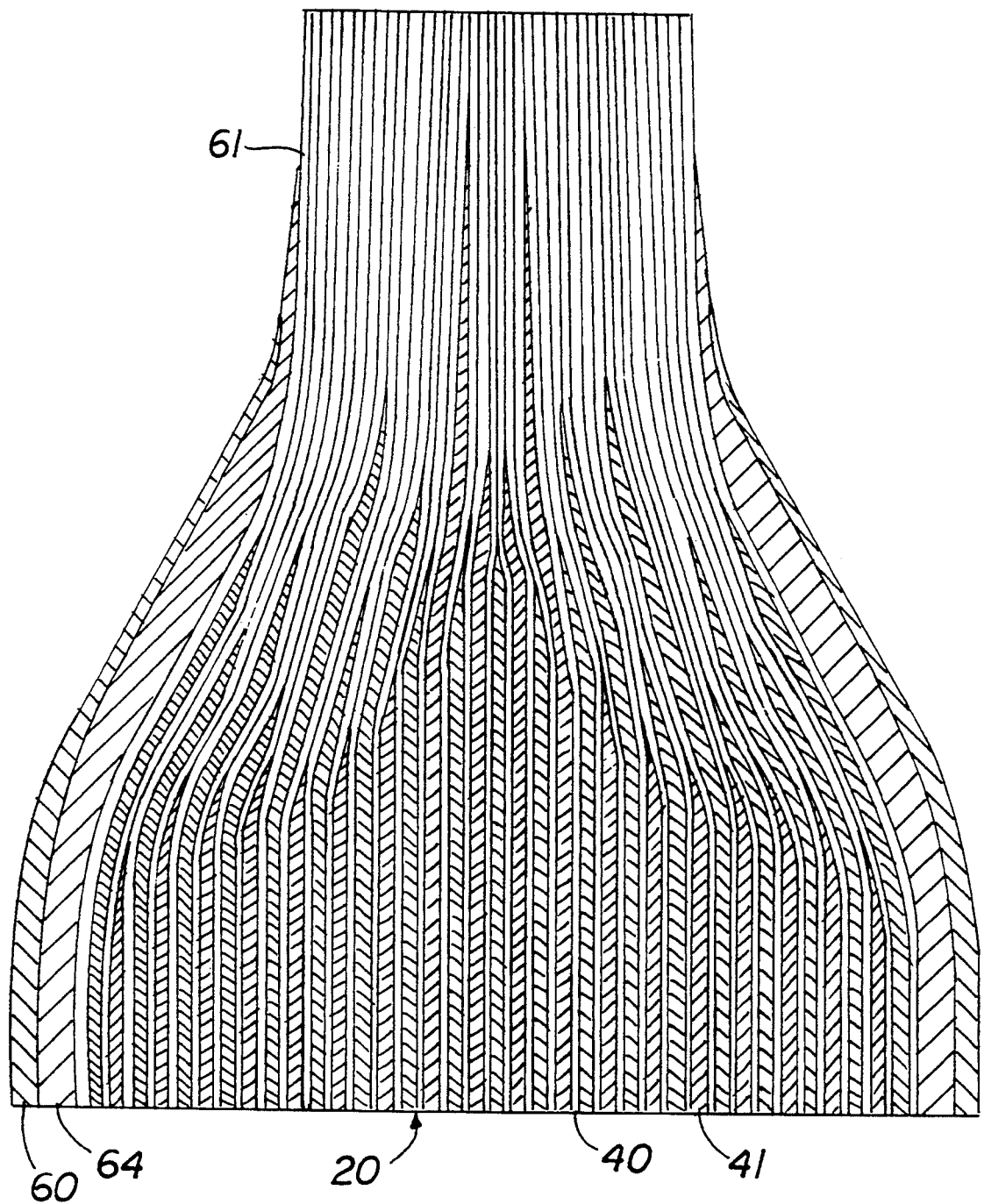
Fig_3A

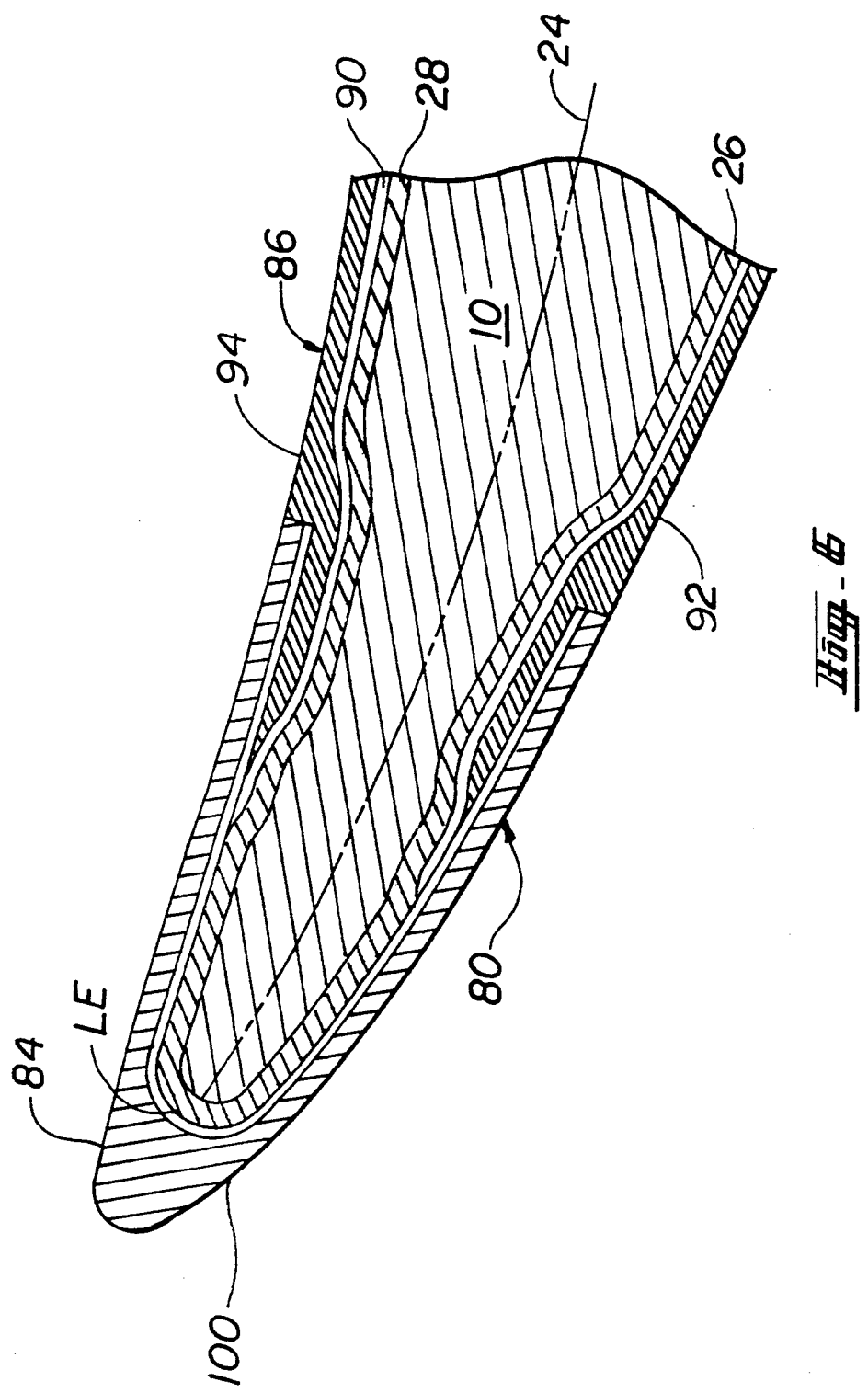

FOREIGN OBJECT DAMAGE RESISTANT COMPOSITE BLADE AND MANUFACTURE

This application is a continuation of application Ser. No. 07/877,504, filed May 1, 1992, abandoned.

BACKGROUND OF THE INVENTION

1. Field of the Invention

This invention relates to composite blades and their manufacture and more particularly to a composite fan blade having unidirectional laminates arranged by increasing span height from the center of the blade towards the outer surfaces with taller laminates interspersed within and breaking up the height-arranged pattern.

2. Description of Related Art

A great effort is under way to replace the relatively heavy metal blades and vanes of fluid flow machines such as gas turbine engine fans and compressors with lighter composite materials. This has led to the development of composite blades and vanes having high strength, made from elongated filaments composited in a light weight matrix.

Over the years the term composite has had several meanings regarding the use of two or more materials having different properties. More recently, in the aerospace industry, the term composite has come to be defined as a material containing a reinforcement such as fibers or particles supported in a binder or matrix material. Many composites are adequate for the present invention including both metallic and non-metallic composites, however the preferred embodiment is made of a unidirectional tape material and an epoxy resin matrix. A discussion of this and other suitable materials may be found in the "Engineering Materials Handbook" by ASM INTERNATIONAL, 1987–1989 or later editions, which are incorporated herein by reference. The composite blades and airfoils of the present invention are preferably of the non-metallic type made of a material containing a fiber such as a carbonaceous, silica, metal, metal oxide, or ceramic fiber embedded in a resin material such as Epoxy, PMR15, BMI, PEEU, etc. Of particular use are fibers unidirectionally aligned into a tape that is impregnated with a resin, formed into a part shape, and cured via an autoclaving process or press molding to form a light weight, stiff, relatively homogeneous article having laminates within.

One particular problem which has discouraged the introduction of these light weight composite gas turbine engine fan blades is their particular vulnerability to what is referred to as foreign object damage (FOD). Many types of foreign objects may be entrained in the inlet of a gas turbine engine, ranging from large birds, such as sea gulls, to hailstones, sand and rain. Damage from foreign objects takes two forms. Smaller objects can erode the blade material and degrade the performance of the fan and engine. Impact by larger objects may rupture or pierce the blades. Portions of an impacted blade can be torn loose and cause extensive secondary damage to the downstream blades and other engine components.

In this regard, the consequences of foreign object damage are greatest in the low pressure compressors and fans of high bypass gas turbine engines. However, these components offer the greatest potential in weight reduction due to their large tip diameters, as great as ten feet, and spans in the order of two or more feet. Many developments have been made to prevent composite fan blade failures such as a leading edge protection strip which also helps provide erosion protection for the fan blade, and particularly for its leading edge.

One particular FOD-related failure mode of composite fan blades is bending and delamination of the blade when it is struck by a heavy object such as a bird, particularly in a region near the radially outward blade tip. This, in turn, can result in secondary engine damage as the blade fragments, including the leading edge protection strip, are ingested through the engine.

Thus, it has become highly desirable to develop light weight composite blades. Of particular importance are long span fan blades made of light weight non-metallic materials for a high bypass ratio gas turbine engines which resist delamination due to bending induced by foreign object impact into the blade.

One development to prevent delamination is disclosed in U.S. Pat. No. 4,022,547, "Composite Blade Employing Biased Layup" by Max W. Stanley, issued May 10, 1977, assigned to the present assignee, the General Electric Company, and incorporated herein by reference. Stanley discloses fabricating a fan or compressor blade by laying up and bonding together a plurality of filament laminates. The filaments of at least a portion of the laminates are skewed, in a chordwise direction, forward and aft of a non-radial blade axis, thus forming a biased lay-up with the blade center of twist biased forward or aft of the blade radial axis. This significantly increases the torsional frequency of the blade. In one embodiment, the filaments are skewed forward such that no filaments run from the blade leading edge to the blade tip but, rather, from the blade leading edge to the blade root. This orientation permits more strain produced by foreign object impact to be transmitted to the blade root where it can be more easily absorbed and dissipated by the blade supporting disc.

A typical non-metallic light weight composite airfoil lay-up manufacture provides laying up the composite airfoil as two halves, then assembling the two halves together to form the airfoil. Older composite designs have suggested the use of a single element lay-ups as described in the prior art description in U.S. Pat. No. 4,051,289, "Composite Airfoil Construction" by Arthur P. Adamson which issued Sep. 27, 1977, and is assigned to the present assignee. The lay-up procedure conventionally starts at the airfoil centerplane by laying up the two halves, convex side and concave side, separately and then bonding the two halves together. The plies are typically of varying width and span or height to form a blade of tapering thickness towards its radially outer tip.

The number of plies or laminations may run on the order of 700. Ply thickness is usually determined by the material to be used and is on the order of 5 or 6 mils. The span height, width, and shape depends, at least in part, on the shape and contour of the blade. One typical well known method of determining ply shapes and span heights provides for taking the airfoil shape laid out flat along its flattened or untwisted blade centerplane, and cutting it into plies of the desired thickness. This then determines the ply span height and shape. This often determines the ply arrangement because most ply lay-up are then arranged smallest to largest from centerplane outward.

This procedure produces a lay-up sequence that has many if not all the radially outward ply edges or tips ending at the centerplane of the airfoil. This is usually a very high stress area during an impact event or other event that causes blade bending. These conventional blade construction methods produce laminate composite blades that form shear planes along blade centerplanes where high stresses often occur. Blade delaminating shear plane stresses at fan blade centerplanes are increased by the long spans and high degrees of twist characteristic of modern high bypass ratio turbofan engines.

SUMMARY OF THE INVENTION

The present invention provides a composite airfoil particularly useful as a fan blade in a large high bypass ratio turbofan engine wherein the blade is generally regarded as large and having a high degree of twist. The composite airfoil of the present invention has at least one progression of filament reinforced laminations, preferably of the unidirectional filament tape type, arranged by span height, starting essentially from blade centerplane outward, and having at least one relatively long filament reinforced lamination having a substantially longer span than the shorter laminations adjacent it and laid up generally along the centerplane so that a shear plane is not created where radially outer edges of the laminations end.

One embodiment provides that the airfoil is made from a progression of groups of the filament reinforced laminations wherein the filament reinforced laminations of the same group have essentially the same span height and the groups of filament reinforced laminations are arranged in order by span height, shortest to tallest starting at the centerplane. The progression is broken by at least one group of relatively tall filament-reinforced laminations.

Another embodiment provides an airfoil further comprising a convex and a concave side made up of groups of laminations. The groups in each side are made from a progression of laminations arranged according to span height wherein each group includes a plurality of progressive laminations and the groups of laminations are arranged in each side out of order of the progression. Yet a further embodiment provides for an arrangement of groups so that no two adjacent groups are in order of the span height progression.

Yet a further feature of the preferred embodiment of the present invention provides that the groups of filament reinforced laminations are comprised of four laminations arranged with a filament orientation sequence of $0°, +\phi°, 0°, -\phi°$. The angle $\phi$ is a predetermined angle as measured from said $0°$ which corresponds to a generally radially extending axis of the airfoil which may be its centerline or stacking line and is preferably about $45°$.

The preferred embodiment of the present invention also includes a metallic clad leading edge on the airfoil for additional FOD and erosion protection and erosion resistant coatings around the airfoil. A tip cap is also provided for improved airfoil sealing against a corresponding fan seal land.

ADVANTAGES

Among the advantages provided by the present invention is a light weight composite blade that is highly resistant to delamination and failure caused by bending and impact from thin FOD such as debris and bird ingestion. The apparatus and method of the present invention enhances the design and capabilities of light weight blades particularly for long blades with a high degree of twist as are found in large diameter fans on high bypass ratio turbofan gas turbine engines. The invention improves the strength while lowering the weight of fan blades and decreasing the amount of structure, both static and rotating, required to support the fan blades. This in turn improves fuel efficiency, lowering SFC (Specific Fuel Consumption).

BRIEF DESCRIPTION OF THE DRAWINGS

The foregoing aspects and other features of the invention are explained in the following description, taken in connection with the accompanying drawings where:

FIG. 3a is a cross-sectional illustration of the lay-up around the root of the fan blade illustrated in FIG. 3.

FIG. 6 is a cross-sectional diagrammatic view through an airfoil section of a turbofan engine composite fan blade in accordance with an embodiment of the present invention.

DETAILED DESCRIPTION OF THE INVENTION

Figure 1:
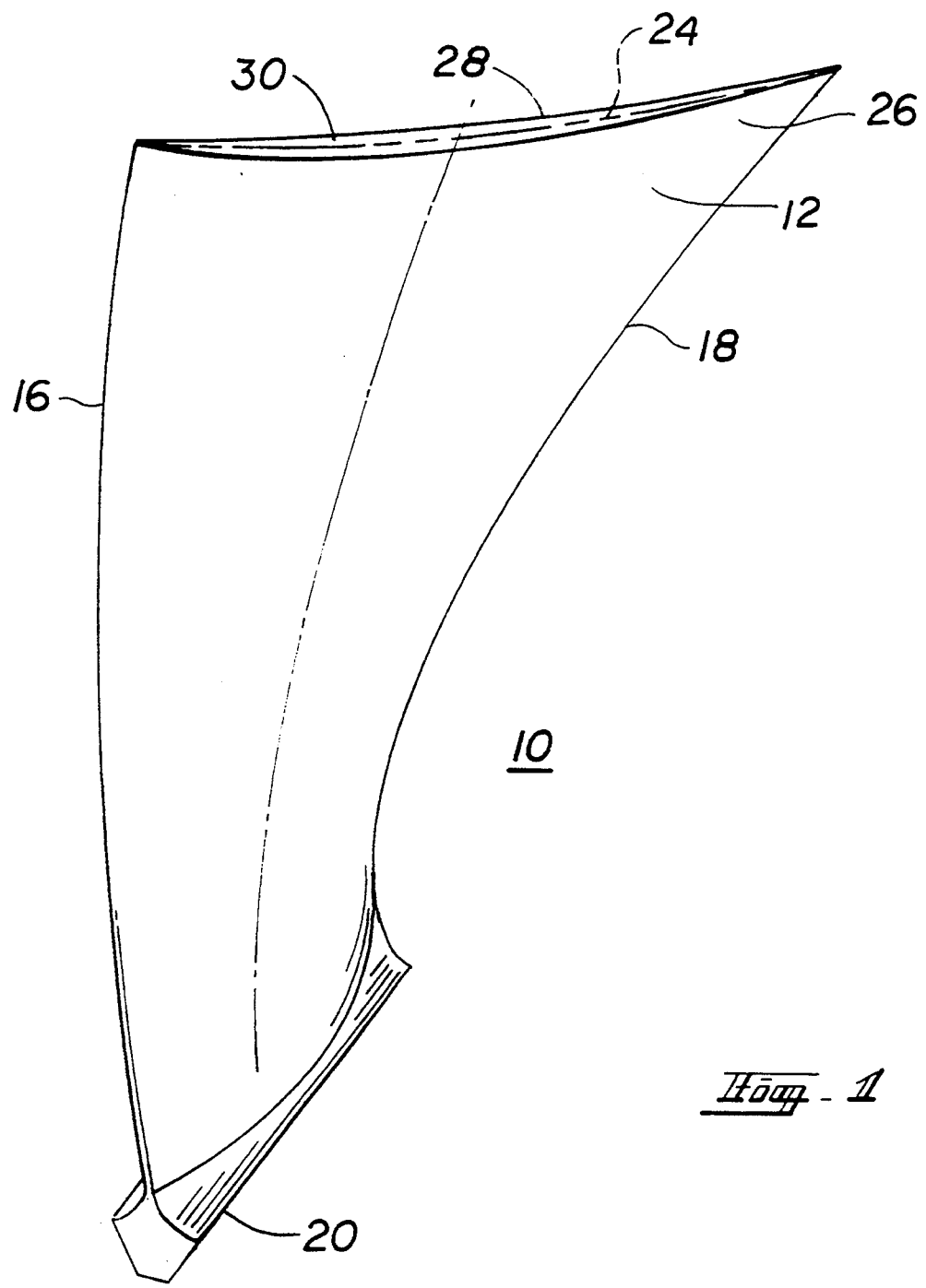
FIG. 1 is a perspective view of a typical turbofan engine composite fan blade.

Illustrated in FIG. 1 is a composite fan blade 10 for a high bypass ratio fanjet gas turbine engine (not shown) having a composite airfoil 12 typically including a leading edge 16 and a trailing edge 18. Composite airfoil 12 extends radially outward from a root 20 to an extent generally defining its span and includes a centerplane 24 that generally divides airfoil 12 into two parts that culminate in the convex side 26 and the concave side 28 of the blade. Composite airfoil 12 is made up of filament reinforced laminations 30 formed from a composite material lay-up generally indicated at 36, in FIG. 2, of filament reinforced airfoil plies 40. As used herein, the terms "lamination" and "ply" are synonymous.

Figure 2:
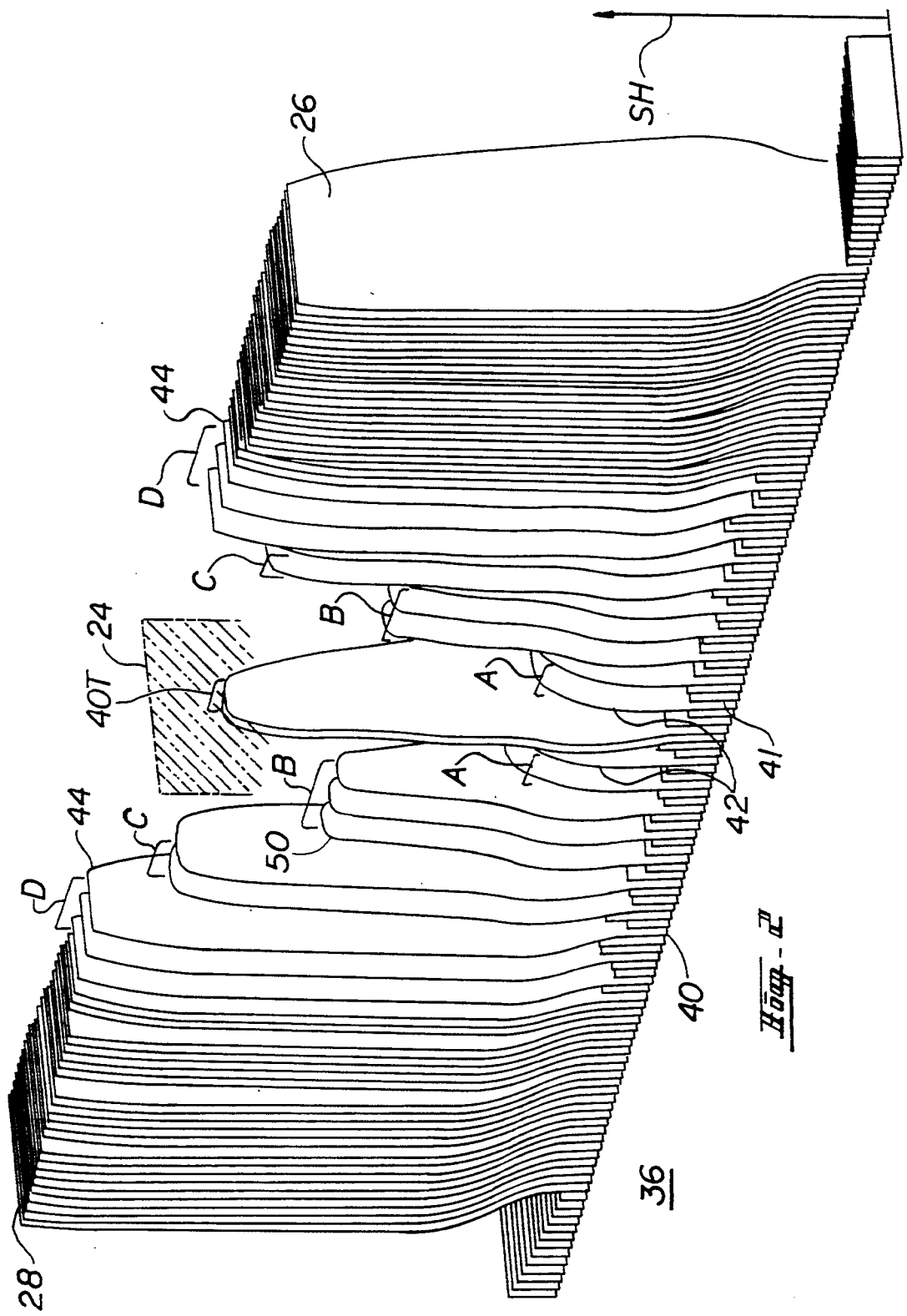
FIG. 2 is an exploded perspective view of a turbofan engine composite fan blade ply lay-up in accordance with one embodiment of the present invention.

Shown in FIG. 2, is one embodiment of a lay-up 36 of airfoil plies 40, generally all made from a unidirectional fiber filament ply material, preferably a tape, as it is often referred to, arranged generally in order of span and used to form a composite airfoil 12 as shown in FIG. 1. The airfoil plies 40 are essentially those plies that form the airfoil 12 of blade 10 in FIG. 1. Between airfoil plies 40 are inserts 41 that are often characterized as root plies that are used to help form the root portion of the blade and not the airfoil portion.

The airfoil plies 40 are basically arranged in order of span height SH, from smallest 42 to tallest 44, from centerplane 24 to convex and concave sides 26 and 28 respectively. This would normally form a shear plane along the centerplane 24 due to radially outer ply tips 50 of the airfoil plies 40 terminating at the centerplane. A shear plane may be formed at other locations transverse and essentially parallel to the centerplane 24 where the radially outer ply tips 50 terminate. A confused shear plane, one in which the shear plane is broken up or interrupted, is formed by placing a relatively tall ply 40T where the arrangement by height calls for a shorter ply. The height of the relatively tall ply 40T is intermediate in length between the shortest and the longest plies in the progression. The present invention preferably provides that the airfoil plies 40 are arranged as groups of airfoil plies A, B, C, and D. The groups are arranged from shortest to tallest A to D respectively, starting at the centerplane 24, wherein each group of airfoil plies A through D have airfoil plies of about the same span height SH. In the general case, each group contains at least two plies, as shown in FIG. 2, but all groups need not contain the same number of plies.

The inserts 41 may be distinguished from the airfoil plies 40 by size, wherein the inserts extend essentially only through the area of the root and are substantially shorter than the airfoil plies. Inserts 41 are used to produce the extremely thick root section which are later machined to the proper dovetail root configuration. The inserts 41 are preferably interspersed among all the airfoil plies. The inserts are of various spans depending upon their position in the airfoil thickness.

The lay-up described above results in a composite airfoil of the present invention which has a progression of filament reinforced laminations of varying span, arranged in order by span length from short to long, arranged starting essentially from blade centerplane outward, and having at least one relatively long filament reinforced lamination having a longer span laid up generally along the centerplane so that a shear plane is not created where radially outer edges of the laminations end.

The laminations are preferably grouped by span such that there is a plurality of groups of the filament reinforced laminations wherein the filament reinforced laminations of the same group have essentially the same span and the groups of filament reinforced laminations are arranged in order by span shortest to tallest starting at the centerplane.

Yet a further feature of the present invention provides that the composite airfoil has essentially all of the filament reinforced laminations and inserts arranged with a filament orientation sequence of 0°, +φ°, 0°, −φ°. The angle φ is a predetermined angle as measured from said 0° which corresponds to a generally radially extending axis of the airfoil which may be its centerline or stacking line and is preferably about 45°. This arrangement is more particularly pointed out and explained in U.S. Pat. No. 4,022,547 by Stanley which is referenced above.

Figure 3:
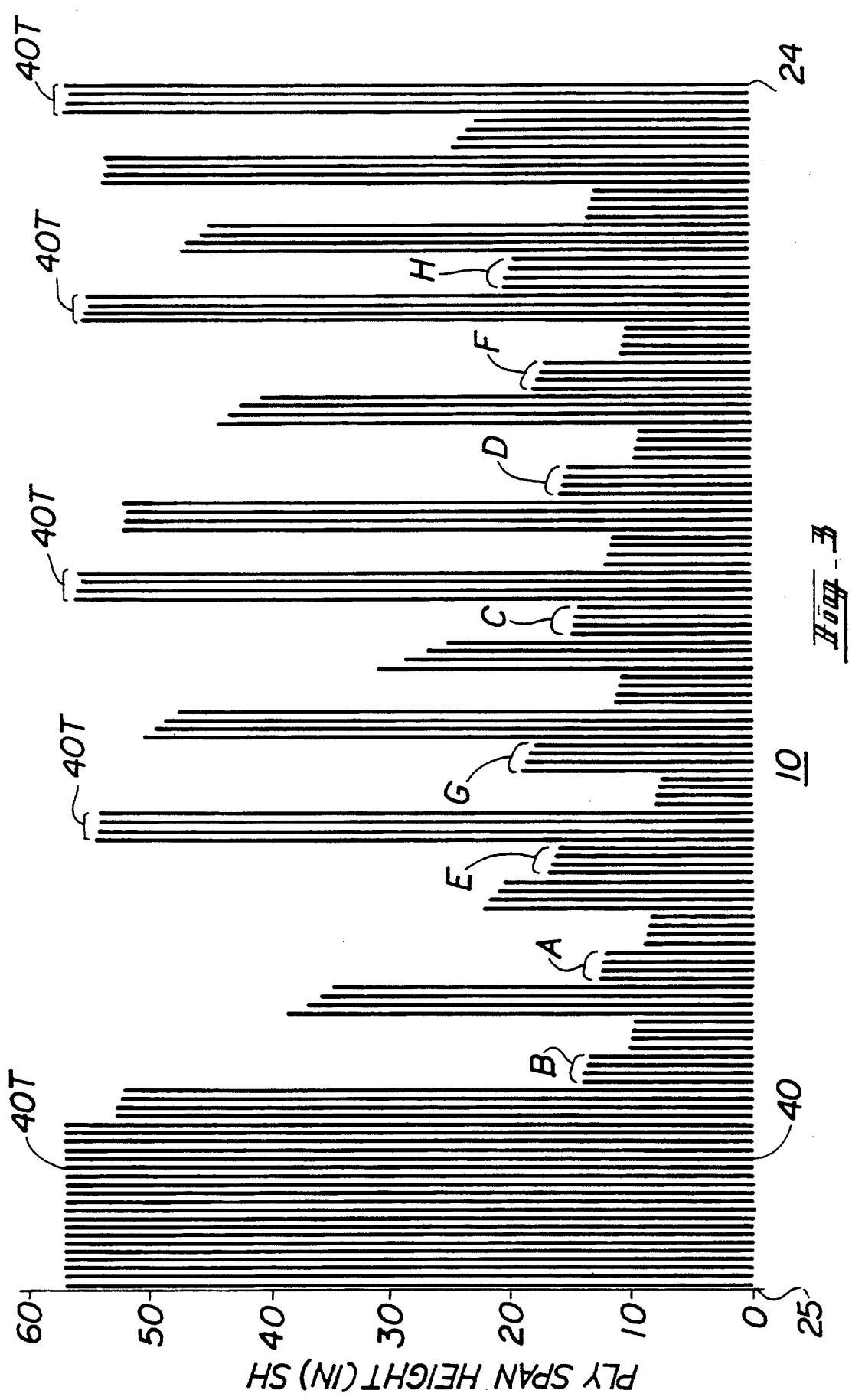
FIG. 3 is a cross-sectional graphical representation of a ply lay-up in accordance with the preferred embodiment of the present invention.

FIG. 3 illustrates a more complicated arrangement of airfoil plies 40 that may be preferred to the embodiment shown in FIG. 2. The illustration in FIG. 3 depicts an arrangement of airfoil plies 40 for half a side of blade lay-up 10 that runs from blade centerplane 24 to a blade surface 25 that represents either the convex side 26 or the concave side 28 of the blade. The arrangement in FIG. 3 provides an arrangement that utilizes a more random distribution of airfoil plies 40 than that shown in FIG. 2. The embodiment shown in FIG. 3 provides that the airfoil plies 40 are grouped together, preferably 4 airfoil plies to a group (A–H), in their respective progressive height succession, generally by span height SH, from shortest (A) to tallest (H), and such that they are out of the span height progression to form groups such as A, B, C, D, E, F, and G of airfoil plies 40 and are arranged in a more random manner than that shown in FIG. 2. These groups are arranged in what is referred to as a more random or mixed up manner so that not many adjacent groups are arranged in a sequence by height and that such sequences are interrupted by groups of relatively tall airfoil plies 40T.

Figures 4, 5:
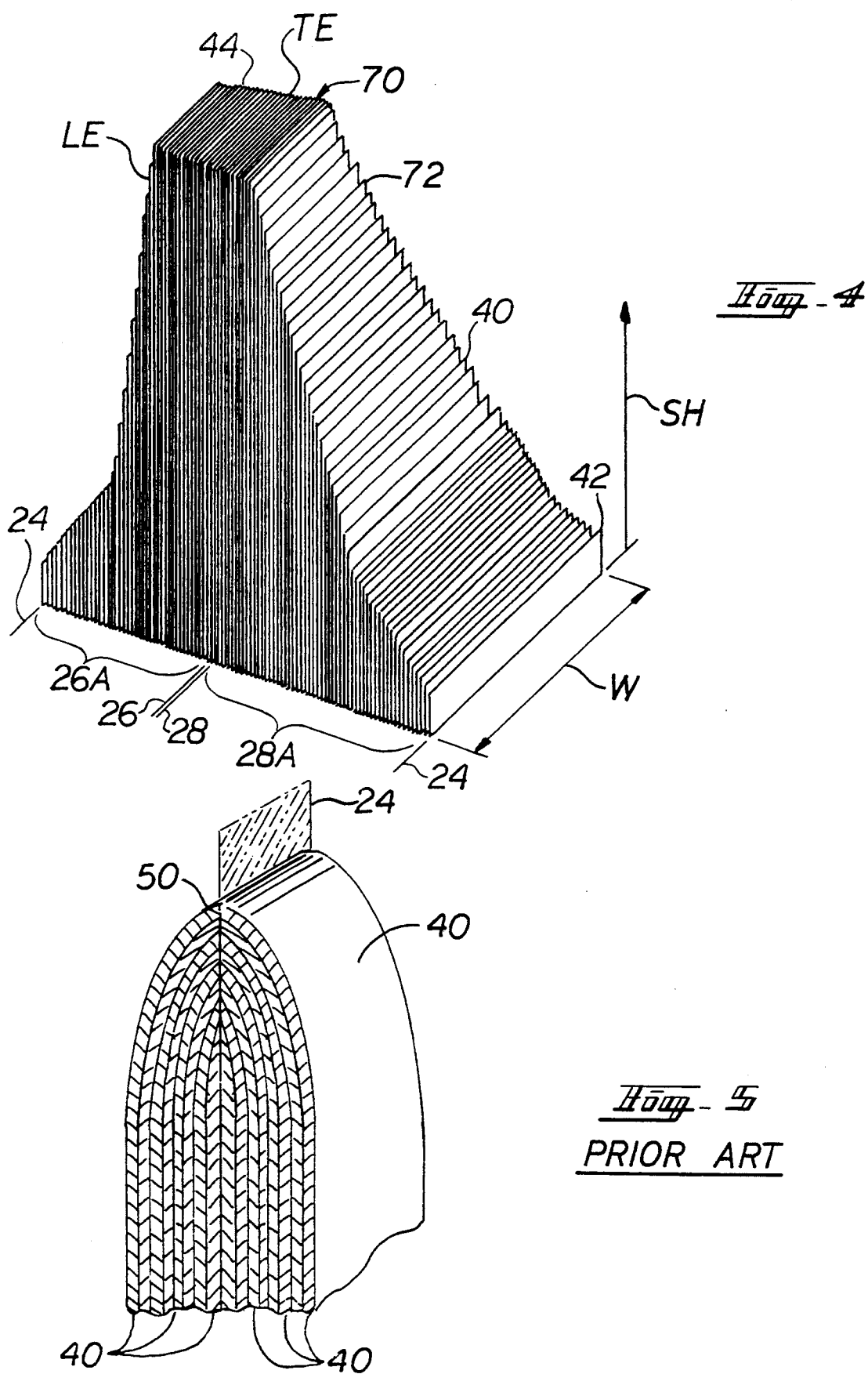
FIG. 4 is a schematic perspective view illustrating how ply shapes and span heights are determined and laid out in accordance with the present invention.
FIG. 5 is a schematic perspective view of the prior art illustrating how laminates form shear planes.

Briefly referring to FIG. 4, a ply span height SH distribution of the present invention begins with a determination of all the ply span heights. Conventionally, a preform shape 70, generally an unmachined and untwisted blade shape, is sliced transversely, from leading edge LE to trailing edge TE, into many small slices 72. This forms two progressions of plies 40, one for a concave section 28A and one for a convex section 26A of the composite airfoil 12 in FIG. 1. Each progression is arranged in order of span height SH, from its smallest 42 to its tallest 44, in a manner corresponding to a position adjacent centerplane 24 to positions corresponding to convex and concave sides 26 and 28 respectively. The number of slices 72 corresponds to the number of airfoil plies or laminations and may run on the order of 700. Ply thickness is usually determined by the material to be used and is on order of 5 or 6 mils. The span height SH, width W, and shape depends, at least in part, on the shape and contour of the blade. One typical well known method of determining ply shapes and span heights provides for taking the preform shape laid out flat along its flattened or untwisted blade centerplane, and cutting it into airfoil plies of the desired thickness. This then determines the ply span height and shape.

In the prior art this often determined the ply arrangement because most ply layups are arranged smallest to largest from centerplane outward as illustrated in FIG. 5. This arrangement forms a shear plane along the centerplane 24 due to radially outer ply tips 50 of the airfoil plies 40 terminating at the centerplane 24. A shear plane may be formed at other locations transverse and essentially parallel to the centerplane 24 where the radially outer ply tips 50 terminate as explained earlier. The prior art did not break up this progression as is done in the present invention as illustrated by the tall airfoil plies 40T disposed at the blade's centerplane 24 in FIG. 2.

Illustrated in FIG. 3a is the area of the lay-up around root 20 wherein airfoil plies 40 are generally indicated by white areas and insert or dovetail plies 41 are generally indicated by lined areas. The present invention provides outer airfoil plies 61 and outer dovetail plies 60 of the blade dovetail root 20 (in FIG. 1) that are formed from graphite fabric material, as opposed to the unidirectional tape. Outer airfoil plies 61 and dovetail plies 60 are mostly machined away during the machining operation to form the dovetail cross-sectional shape. These plies are designed to be of substantial thickness to eliminate the possibility of machining any of the other plies of the blade. Next to the outer dovetail plies 60 is a series of graphite tape plies which are referred to as pad plies 64. These plies are laid up in a +45°−45° ply stacking sequence to help soften the load path in the blade from the dovetail pressure faces to the interior of the blade.

The graphite fabric on the outside helps and the "pad" plies add additional softening of the plies in the blade root. Further into the blade root are the airfoils plies 40 which also are part of the root and the inserts 41 which give the root its thickness.

Illustrated in FIG. 6 is another feature of the blade, an erosion protection system 80 including a leading edge shield 84 and a coating system 86 for the blade 10 comprising erosion resistant coatings around the leading edge LE of airfoil 12 of blade 10 in FIG. 1. The preferred embodiment of the present invention provides a metallic clad leading edge 100 for the leading edge shield 84 for additional FOD protection. A tip cap (not shown) disposed about the radially outer edge of the airfoil is preferably provided for improved airfoil sealing against a corresponding fan seal land.

Another possible component of the erosion protection system 80 is a trailing edge cap (not shown). The trailing edge cap is wrapped around the trailing edge TE of the blade similar to the leading edge shield 84. The trailing edge cap may only extend partially down the span of the blade from the radially outer edge, for example, about 12" to 15". The trailing edge cap helps prevent or slows the delamination of the trailing edge during an impact event such as a bird strike.

The preferred embodiment of the present invention, as illustrated in FIG. 6 as well as FIG. 3A, includes a multi-layer coating system 86 that uses commercially available materials. Before curing of the laid up blade 10, a relatively thin nitrile phenolic adhesive layer 90 is applied to the surface of the blade 10. The nitrile phenolic adhesive layer 90 is applied outwards of the outer airfoil plies 61 which are mostly machined away and about 0.005 inches thick in this embodiment, and commercially available as AF-32 by the 3M Corporation.

The next layer of the preferred erosion coating system is different depending upon which surface of the blade is being coated. The major erosion on a blade typically occurs on the pressure or concave side of the blade as this is the side of the blade which "pushes" all the air and performs the work. The convex or suction surface of the blade is not as affected by erosion as its surface is protected from the airflow and the materials in the airflow.

Therefore, the preferred embodiment of the blade 10 includes two different erosion protection schemes to suit the conditions on the convex and concave surfaces. The convex side 26 (or suction surface) of the blade 10 is only further protected with a sprayed polyurethane paint 92, a standard in the industry. The concave side 28 (or pressure surface) of the blade 10 is provided with an additional erosion protection comprised of a heat curable polyurethane sheet compound layer 94, commercially available from B. F. Goodrich. This curable polyurethane material is supplied with an adhesive layer on one side and is applied to the blade in a secondary operation. It is then cured in a second curing process.

Another feature of the composite fan blade of the present invention is a wear coating (not shown) for the dovetail root 20 of blade 10 in FIG. 1. The composite dovetail root 20 is enhanced by the wear coating which is applied to the root so it is better able to withstand the loads generated during operation. The wear coating is made of a low friction TEFLON ®/aramid material available from the Tribon Corporation. The coating is a TEFLON ®/aramid impregnated cloth which is "B" staged (partially cured) then bonded to the blade dovetail where final cure of the material occurs during the bonding operation. This material is capable of withstanding the loads in the blade root during normal operation and is a replaceable or repairable item on the blade.

The following describes the composite blade manufacturing process of the present invention which begins with the cutting of material into the proper ply shapes which when positioned properly in the tooling will compact under heat and pressure to produce a composite blade in accordance with the embodiments of the present invention as described above.

The plies for the fan blade fabrication may be cut using two methods. The first ply cutting method comprises manually cutting the plies with scissors and knives. The various ply shapes, determined by performing a topographical scribe of a master blade, are cut out of cardboard, and the cardboard sheets are used as templates. The ply shape is traced onto the backing of the unidirectional fiber filament ply material and the shapes are cut and the plies compiled into various kits or groupings for lay-up.

The second cutting method, which is preferred over the first method, features an automated cutting of plies. The cardboard ply shapes are digitized and the digitized ply data is used to drive an ultrasonic knife on a gantry above the unidirectional fiber filament ply material laid out on a cutting table. The knife is directed to follow the digitized data and cut the material laid out on the table and the plies compiled into various kits or groupings for lay-up. Another alternate cutting method employs steel rule die boards to cut the plies.

Next the plies are laid according to the arrangement described herein to achieve a filament reinforced lamination composite blade described previously. The present invention eliminates some of the ply steps at the radially outward tip of the plies and at the airfoil centerplane. The blade plies are mixed up so that plies are not all sequenced smallest to largest in the lay-up from centerplane towards convex or concave blade side. This mixing of the lay-up sequence of the plies leads to what is called a confused shear plane lay-up. Although the pattern seems to be random, certain criteria are preferably used to arrange the ply sequence. First, some full span plies are placed on the outsides of the airfoil. This is illustrated in FIG. 2 as 10 full span plies that are used on both sides of the airfoil. This construction maintains a solid structural skin on the outside of the airfoil and helps eliminate the possibility of ply steps showing through the plies upon curing. If the ply steps did protrude from the airfoil sides the airfoil would not be smooth, thereby adversely affecting efficiency.

The remaining plies are then mixed to create the confused shear plane design. Preferably, the taller plies are distributed throughout the remaining blade thickness so that the taller plies help in preventing the sliding of shorter plies in the airfoil. As the material lay-up is subjected to temperature and pressure, the resin becomes very liquid and the plies tend to move under the pressure load. With the taller plies scattered through the thickness of the blade, they are more confined and cannot slide to the extent that a shorter ply could slide. Since the taller plies cannot move, their lack of movement tends to hold the shorter plies in position.

Another important feature of the confused shear plane lay-up of the present invention is the grouping of plies in the lay-up. The blade lay-up is a standard quasi-isotropic lay-up of $((0°, +45°, 0°, -45°)_n)_s$ and, with the confused ply sequence having the numerous ply shapes, the possibility of a $+45°$ and $-45°$ ply being in contact with each other in the blade is high. Care must be taken to avoid this possibility due to the high stress state caused during the cool down portion of the curing cycle.

The carbon fiber has a very low coefficient of thermal expansion (CTE) while the epoxy resin has a relatively high CTE. When the material cures and then cools down from a cure temperature, for example of about 350° F., the +45° and −45° plies have their maximum shrinkage occur in opposite directions. With the two plies together, a high stress field is formed making the bond interface weaker. To avoid this weak interface, the plies should be grouped before they are mixed into the lay-up.

The illustration shown in FIG. 3, depicting a preferred form of the invention shows four airfoil plies always grouped together, and having the groups distributed through the airfoil, while always maintaining symmetry about the blade centerline. The multi-ply groups may be comprised of plies of slightly differing heights, and if so, are preferably arranged with the tallest ply, always being a 0° ply, always toward the outside of the airfoil. A blade having a 0° ply always faces the outside of the airfoil to protect the other three airfoil plies in the group (+45°, 0°, −45°) from the other groups, ensuring that the lay-up never has +45° and −45° plies coming in contact with each other.

The lay-up step of the airfoil preferably includes the insertion of root plies referred to as inserts to form the root of the blade. The inserts may be distinguished from the airfoil plies by size wherein the inserts extend essentially only through the area of the root and are substantially shorter than the airfoil plies. Inserts are used to produce the extremely thick root section which are later machined to the proper dovetail root configuration. The inserts also preferably have a (+45°, 0°, −45°) orientation arrangement of plies and are interspersed among all the airfoil plies. The inserts are of various spans depending upon their position in the airfoil thickness.

The use of the confused shear plane lay-up in a highly twisted airfoil configuration created a unique problem for lay-up of the airfoil. Conventional airfoil lay-up involves laying up the airfoil as two halves from the airfoil centerplane starting with the shortest ply and increasing ply span to the tallest ply (full size) last on the lay-up. This sequence allows the airfoil plies to be laid up onto a contoured surface using a copy of the topographical scribe as reference for the ply positions. This is very difficult to accomplish using the present invention for an airfoil with a high degree of twist as used on modern high bypass ratio fan blades, for which this invention was developed. The high degree of twist in the blade, the massive thickness at the root of the blade, and the material bulk factor would create a mismatch of the two halves if they are laid up separately and then assembled. This mismatch can create wrinkles at the centerplane of the airfoil which is a high stress area.

To eliminate this problem, the airfoil, according to the present invention, is preferably assembled (preformed) in the tool from one side continuously through to the other side. This ensures a good match between the airfoil plies at the centerplane and helps prevent wrinkling in the airfoil. Laying up the airfoil from one side only and incorporating a confused shear plane lay-up of the present invention, prohibits or makes very difficult the conventional use of a lay-up guide to position the airfoil plies. Another method was developed to better define the exact location of the ply.

The present invention provides that an overhead projector is suspended above the lay-up tool so that it projects down upon the tool. Then a topographical scribe of the airfoil is positioned into the tool. A clear transparency is positioned on the overhead and carefully and accurately lines are manually traced, though not limited thereto, onto the transparency so the projected line on the tool matches the various lines on the topographical scribe of the master. The transparency is also marked so that the tool can always be positioned into the same reference to the overhead projector. The tool, its supporting table, and the overhead, with its drawn ply positions, then become a matched group always used together to lay up an airfoil.

The tool can then be removed for processing and easily be repositioned under the overhead projector to accommodate another lay-up. The overhead projector projects all the ply shapes onto the tool without interfering with the lay-up and without being affected by the varying ply shapes being positioned in the tool.

As discussed earlier, the material has a bulk factor which affects the lay-up and position of the plies during the preforming operation. To reduce the bulk factor of the material and eliminate some internal wrinkling found in earlier blades, believed to be caused by the reduction of the bulk during final cure of the part, hot debulks are performed during the lay-up of the airfoil. The hot debulks are performed by vacuum bagging the airfoil preform onto the tool and then running the preform through an autoclave cycle at 150° F. temperature and 100 psi pressure. This cycle debulks the material closer to its final thickness while affecting the thermal characteristics only slightly; therefore, not affecting the final cure cycle and the properties of the final airfoil. The two hot debulks are performed with one third of the plies assembled in the tool and then again with two thirds of the plies assembled into the tool.

After the lay-up of the blade is completed, some stitching of the blade to improve its resistance to impact may be desired. The completed preform is transferred from the lay-up tool and put into a secondary fixture which has been modified to allow stitching of the blade in certain areas. Stitching of the blade can be accomplished in two steps, ultrasonically punching the holes through the preform then hand stitching with KEVLAR ® or glass thread. The ultrasonic punching of the holes through the preform need not be covered in this disclosure.

After the completion of the stitching or completion of lay-up if stitching is not used, the airfoil preform and tool has to be prepared for autoclave curing. Conventionally, airfoils are cured in matched tooling so that they have smooth surfaces on both sides. The size and twist of large composite fan blades makes this more difficult so a new method was devised to autoclave cure the airfoil while still getting both airfoil surfaces smooth. Using the same graphite/epoxy material or similar materials that the blade tool was constructed from, preferably a graphite/epoxy material, a caul sheet is fabricated to smooth the bag side of the airfoil. The caul plate should be designed to be thin over much of the airfoil, allowing it to flex and form to the preform shape. The root area of the caul sheet should be thickened to maintain its configuration. The thickened root section ensures that the root area of the molded blade will be the proper configuration (shape and size) for machining. The caul sheet is trimmed to fit into the tooling in the root area.

Before positioning of the caul sheet, short strands of fiberglass tow are positioned around the perimeter of the airfoil. The strands are placed in contact with the preform and extend out from under the caul plate. This forms string bleeders which allow gases to escape from under the caul plate while limiting the amount of resin flow from the preform during the curing process. Then care must be taken to properly position the caul sheet and rest it up against small stops placed near the tip of the airfoil and trailing edge to further help maintain its proper position.

Another unique feature of the present invention's blade vacuum bagging procedure is the use of an annealed aluminum screen as part of the air breather system. The annealed aluminum screen maintains high flow of any gaseous substances under the bag even at higher molding pressures. The screen ensures that all parts of the preform are exposed to vacuum and then pressure, not allowing any of the bag to become sealed off.

Upon completion of the bagging, the blade is autoclave cured using a cycle to ensure consistent heat-up in the thin and thick sections of the preform while also preventing any exothermic reaction in the material.

The root of the blade consists of the airfoil plies which also form part of the root and the inserts which are only present in the root giving the root the increased cross section necessary for blade performance under impact loads. The design of the blade root incorporates two different materials assembled in a unique sequence. The outside plies of the blade dovetail are graphite fabric material which are the machining plies, or the plies which will mostly be machined off during the root configuration machining operation. These plies are designed to be of substantial thickness to eliminate the possibility of machining any of the other plies of the blade.

Under the machining plies, are a series of graphite tape plies which we call the "pad" plies. These plies are laid up in a +45°/−45° ply stacking sequence. This sequence was developed to soften the load path in the blade from the dovetail pressure faces to the interior of the blade. The graphite fabric on the outside helps and the "pad" plies add additional softening of the plies in the blade root. Further into the blade root are the airfoil plies which also are part of the root and the inserts which give the root its thickness. Though not specifically illustrated, the finished blade is preferably provided with a wear coating along the areas which normally contact the slot that receives the blade root.

While the preferred embodiment of the present invention has been described fully in order to explain its principles, it is understood that various modifications or alterations may be made to the preferred embodiment without departing from the scope of the invention as set forth in the appended claims.

We claim:

1. A polymer matrix composite blade comprising:
an airfoil having concave and convex sections disposed on opposite sides of a centerplane of the composite blade,
said concave and convex sections each comprising at least one concave and one convex progression respectively of groups of filament reinforced airfoil laminations, each group comprising at least two filament reinforced airfoil laminations,
all of said laminations in each group having substantially equal spans,
said groups of filament reinforced airfoil laminations being of varying span,
said progressions arranged in order by span from shortest to longest starting essentially from said centerplane outward, and
a central group comprising at least one relatively long filament reinforced airfoil lamination disposed essentially at said centerplane and having a span intermediate in length between the shortest and the longest laminations of said progression and longer than the laminations adjacent to said central group so that a shear plane is not created.

2. A polymer matrix composite blade comprising:
an airfoil having concave and convex sections disposed on opposite sides of a centerplane of the composite blade,
said concave and convex sections each having an arrangement of groups of filament reinforced airfoil laminations wherein said groups are grouped from at least one concave and one convex progression respectively of said filament reinforced airfoil laminations, each group comprising at least two filament reinforced airfoil laminations,
said progressions are derived from a preform shape arranged in order by span height from shortest to longest starting essentially from a point corresponding to said centerplane outward,
each of said groups having an average height that is unequal to the average span height of adjacent groups within its corresponding one of said concave and convex sections, and
a first group in at least one of said convex and concave sections, wherein said first group has an average span height equal to at least a longest one of said average span heights wherein said first group is disposed essentially adjacent said centerplane so that a shear plane is not created.

3. A polymer matrix composite blade as claimed in claim 2 wherein
said laminations within each group within a first plurality of groups within each of said sections are arranged in a sequence by said span height from shortest to longest starting from the lamination nearest said centerplane.

4. A polymer matrix composite blade as claimed in claim 3 wherein said arrangement of groups or filament reinforced airfoil laminations in each of said sections further comprises a second plurality of said groups of filament reinforced airfoil laminations, said second plurality comprising laminations of equal span height, and said groups of said second plurality are interspersed among said groups of said first plurality.

5. The polymer matrix composite blade as claimed in claim 4 wherein said laminations of equal span height are equal in length to the longest of all laminations in said sections.

6. The polymer matrix composite blade as claimed in claim 5 wherein essentially all of said filament reinforced airfoil laminations in each of said sections are arranged having a filament orientation sequence of 0°, +$\phi$°, 0°, −$\phi$°, wherein $\phi$ is a predetermined angle as measured from said 0° and said 0° generally corresponds to a radially extending axis of the airfoil.

7. The polymer matrix composite blade as claimed in claim 6 wherein $\phi$ is 45°.

8. The polymer matrix composite blade as claimed in claim 7 further comprising an erosion resistant coating system around at least a portion of said airfoil.

9. The polymer matrix composite blade as claimed in claim 7 further comprising an erosion resistant coating system around at least a portion of a core of said airfoil wherein said core comprises said filament reinforced airfoil laminations surrounded by a machining fabric layer.

10. The polymer matrix composite blade as claimed in claim 9 further comprising leading edge shield means for protecting the blade against foreign object damage.

11. The polymer matrix composite blade as claimed in claim 10 wherein said leading edge shield means comprises metallic cladding around a leading edge of said airfoil over said coating system.

12. The polymer matrix composite blade as claimed in claim 11 wherein said erosion resistant coating system comprises:

a nitrile phenolic adhesive layer applied to the outside of said machining fabric layer, a sprayed polyurethane paint layer over said nitrile phenolic adhesive layer on said convex section, and a heat cured polyurethane compound layer over said nitrile phenolic adhesive layer on said concave section.

13. The polymer matrix composite blade as claimed in claim 12 further comprising a repairable wear coating over a root of said blade.

14. The polymer matrix blade as claimed in claim 4 wherein each group of said filament reinforced airfoil laminations is comprised of four such laminations.

* * * * *